C. HUNNICUTT.
CORN GRADER.
APPLICATION FILED APR. 20, 1908.

989,976.

Patented Apr. 18, 1911.

2 SHEETS—SHEET 1.

WITNESSES:
Robert L. Hearn.
R.G. Randle,

Charles Hunnicutt.
INVENTOR;
BY Robert W. Randle,
ATTORNEY.

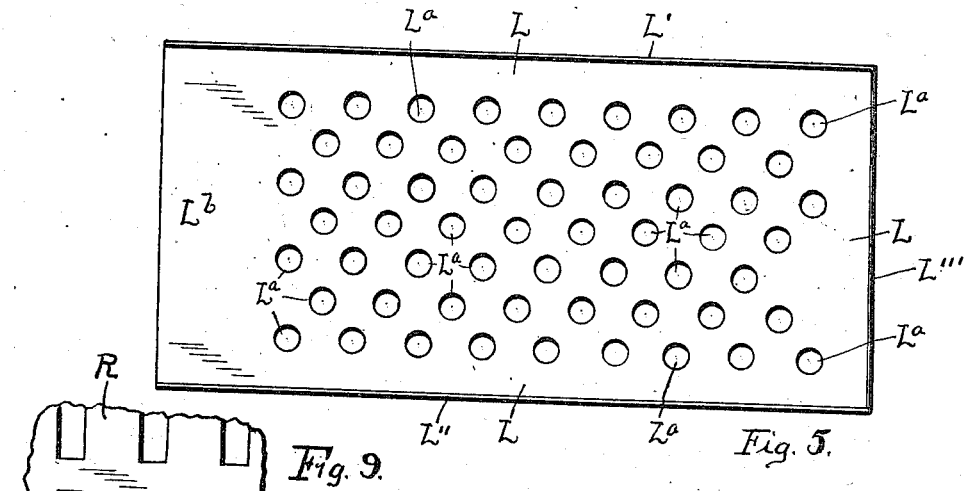
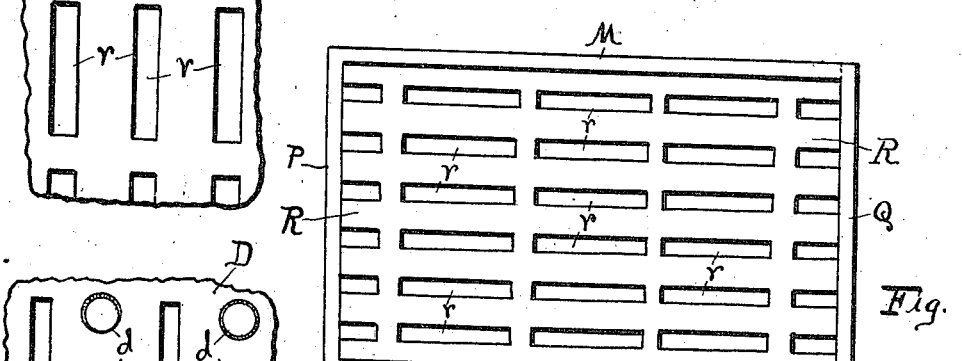
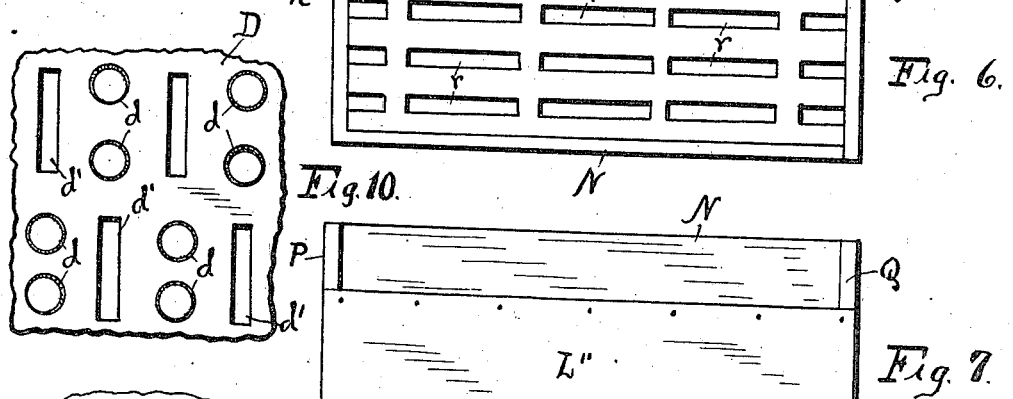
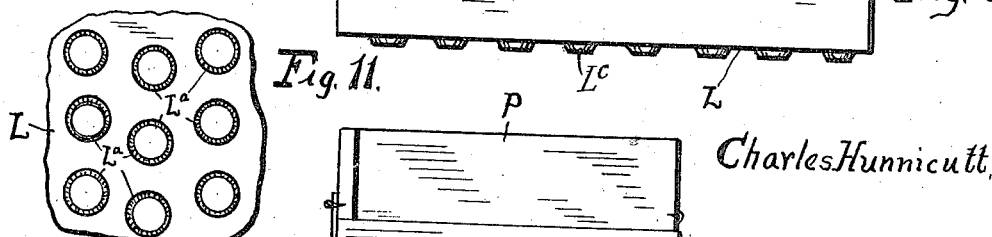

UNITED STATES PATENT OFFICE.

CHARLES HUNNICUTT, OF WILMINGTON, OHIO, ASSIGNOR TO THE CHARLES HUNNICUTT COMPANY, OF CLINTON COUNTY, OHIO, A CORPORATION OF OHIO.

CORN-GRADER.

989,976.  Specification of Letters Patent.  Patented Apr. 18, 1911.

Application filed April 20, 1908. Serial No. 427,984.

*To all whom it may concern:*

Be it known that I, CHARLES HUNNICUTT, a citizen of the United States, residing at Wilmington, in the county of Clinton and in the State of Ohio, have made certain new and useful Improvements in Corn-Graders, of which the following is a full specification, being such as will enable others skilled in the art to which the invention relates to make and use the same.

My invention relates, more particularly, to a portable and manually operable corn grading device for grading seed corn.

The object of my present invention, broadly stated, is to provide a portable corn grader which will be strong and durable in construction, positive in action, light in weight, easily operated and controlled, and which can be manufactured and sold at a comparatively low price.

More particularly speaking, my object is to provide a portable corn-grader adapted to grade grains of seed-corn as to thickness and to width, and to eliminate undesirable grains, and to accomplish the same at one operation and with certainty and precision.

Other objects and particular advantages of my invention will suggest themselves in the course of the ensuing specification.

The preferred manner of carrying out the objects of my invention in a practical manner is shown most clearly in the accompanying two-sheets of drawings, in which—

Figure 1:
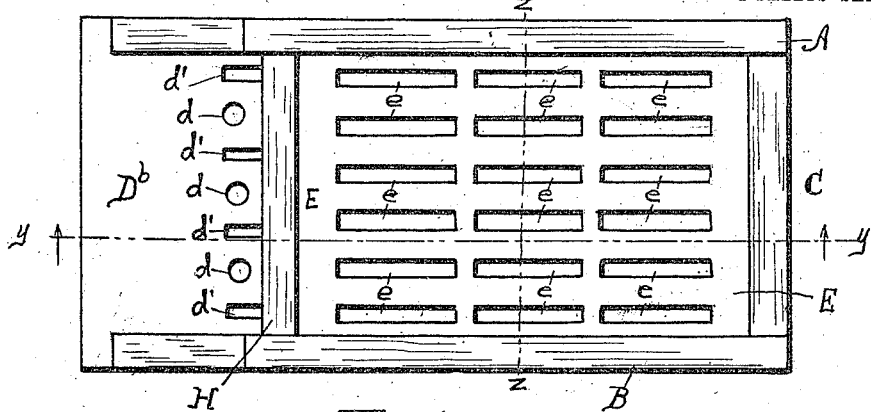
Figure 2:
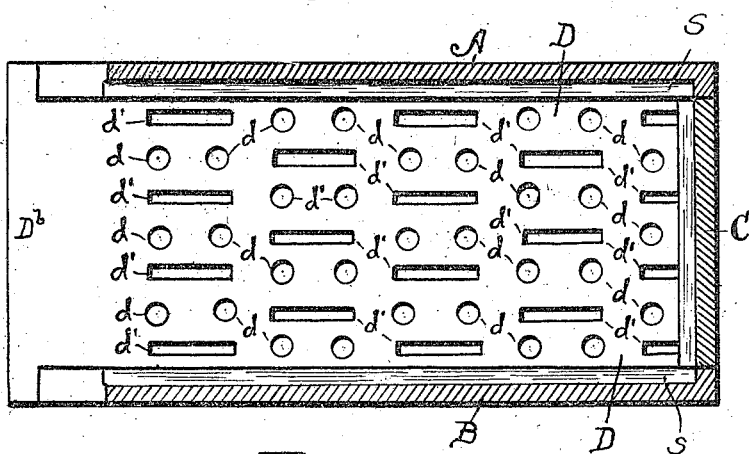
Figure 3:
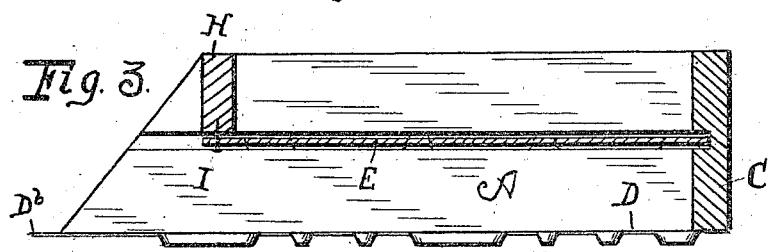
Figure 4:
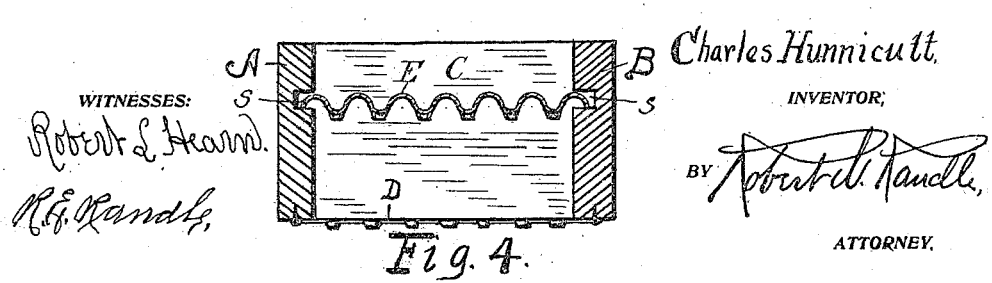

Figure 1 is a top plan view of one manner of construction, showing the entire device in operative position. Fig. 2 is a central horizontal section of the same. Fig. 3 is a longitudinal vertical section of the same, as taken on the line $y$—$y$ of Fig. 1. Fig. 4 is a vertical cross sectional view of the same as taken on the line $z$—$z$ of Fig. 1. Fig. 5 is a plan view of a slightly modified form, with the upper screen removed. Fig. 6 is a plan view of the upper screen, and its frame, as used with the construction shown in Fig. 5. Fig. 7 is a side elevation of the combined parts shown in Figs. 5 and 6, but modified to show the screens of equal lengths. Fig. 8 is an end elevation, taken from the discharge end, of the combined parts shown in Figs. 5 and 6. And Figs. 9, 10 and 11 each show a portion of the various screens, showing the apertures therethrough in approximately actual size.

Similar indices denote like parts throughout the several views.

Referring first to Figs. 1, 2, 3 and 4, the letters A and B denote the two sides of the frame of my device, which sides are identical with each other, they being spaced apart and connected at one end by the end member C, thereby completing the frame proper.

The letter D denotes the lower screen which is formed, preferably, of sheet metal having round apertures $d$ interspersed with elongated or slot apertures $d'$ formed therethrough substantially as indicated. Said apertures are formed flaring, protruding downward substantially as indicated. Said lower screen D is preferably secured to the lower edges of the frame, the space between the screens being open at one end but closed at the other by end member C. The function of the open end is to serve as a discharge opening for the grains that do not pass through the lower screen, but it is apparent that the end might be closed during the screening operation and then opened to permit the discharge of such grains therefrom.

The forward ends of the sides A and B may be beveled back and upward from their lower forward ends as indicated. Formed in the sides A and B are grooves S which receive the edges of the upper screen. The screen E is corrugated longitudinally thereof, and in the depressions of each of the corrugations is formed a plurality of parallel slots $e$.

The letter H denotes a tie connecting the sides A and B near their forward ends, as shown in Figs. 1 and 3. Said tie being located with its upper edge even with the upper edges of the sides A and B and extending down even with the upper edge of said grooves, that is to say,—even with the upper screen E.

From the above it is apparent that the upper screen E is made removable, that is it may slide forward and backward in the said grooves, and it may be secured in operative position by screws or nails, or otherwise, as indicated by the nail I, connecting it with the tie H, as in Fig. 4.

Referring now more particularly to Figs. 5 and 6, the letter L denotes a screen having a multitude of round apertures $L^a$ therethrough as shown in Fig. 5. Said screen is formed, preferably, of sheet metal, and said apertures are formed flaring and they project downward below the body of the screen, as indicated at L$^c$ in Fig. 7. An unperforated portion, L$^b$, extends forward forming a discharge or spout, as shown in Fig. 5. The sides of the screen L are bent upward at right-angles, forming the sides L′ and L″, and the rear end of said screen is bent up, the same as said sides, forming the end L‴, also approximately at right angles to the screen.

The letters M and N denote the sides, and the letters P and Q denote the ends of a frame adapted to fit between the sides L′ and L″, and extending from the end L‴ forward to approximately even with the forward termination of the apertures L$^a$. Said frame is adapted to be secured to said parts L′, L″ and L‴ by nails or screws, as indicated in Fig. 7, with the lower edge of said frame located some distance above the body L of the screen, and extending above said sides and ends.

Secured on the underside of the frame formed by the members M, N, P and Q is the screen R, having the slots $r$ therethrough. Said screen R is in every essential particular like the screen E above referred to.

If desired the spout L$^b$ of the screen L, and the spout D$^b$ of the screen D, may be dispensed with (or they may be otherwise formed) as for instance forming the device as shown in Fig. 7.

It is apparent that the form of the apertures in the screens L and R may be changed to the form of apertures shown in the screens E and D or vice versa.

In practice the device is made much larger than that shown in the drawings, in which case the apertures in the various screens are formed of dimensions substantially as indicated in Figs. 9, 10 and 11.

The operation of my invention is very simple, for instance: a quantity of shelled corn is placed on the upper screen, the device is then vibrated manually causing certain of the grains to pass through the screen E and to fall onto the screen D, through which certain of the grains will pass, and certain other grains will pass out over the spout D$^b$. It is intended that the round apertures will grade the grains as to width, while the slot apertures will grade the grains as to thickness. For instance: with the device having the upper screen with comparatively large oblong apertures and with the lower screen having the round apertures and the smaller oblong apertures, we get four grades of corn: the large and irregular kernels held in the upper screen (that will not deliver freely in a planter); the medium standard grades that pass through the upper screen and out over the spout of the lower screen; the grains that are too narrow for good seed which pass through the round holes of the lower screen; and the grains that are too thin for good seed, which pass through the narrow oblong apertures in the lower screen. In the lower screen instead of the circular openings I may employ openings of another form or forms, having dimensions practically equal to the diameter of the circular openings shown. It is understood that the function of the circular opening is to accommodate the passage of comparatively thick and narrow or rounded kernels which are not admitted through the oblong openings, and which are not of the proper size and shape for seed. In the use of either the circular or the other forms of openings, as noted, I accomplish the separation of the kernels, the desirable ones remaining on the lower screen. From the above it will be apparent that the grains which are retained on the upper screen will be too large, especially as to thickness, and the grains which pass through the lower screen will be small, especially as to width; and that the grains which pass out over the spout of the lower screen, or retained thereon, and deposited in a separate vessel, will be graded both as to width and to thickness. It is essential that the openings in the upper screen have a given width and be of greater length than the circular opening (or its mechanical equivalent) in the lower screen, and it is also essential that the circular opening (or its mechanical equivalent) in the lower screen be at least as wide as the openings in the upper screen, not necessarily the same width, but it must not be less to accomplish the result desired. In order to specifically grade kernels of corn as to thickness of kernel and also as to width of kernel, it is necessary that the kernels be made to enter the apertures in the upper screen endwise or sidewise, and endwise through the round aperture of the lower screen, and since the majority of kernels on an ear of corn are flat in shape, in order to facilitate the work of grading and do it accurately, it is necessary that means should be provided to tilt or turn the kernels from the flat position, which they normally assume, so that they will enter the apertures in the manner stated above, and to accomplish this, the screens are formed with inclines leading downward to the apertures. These inclines are produced by corrugating the screens or by pressing the metal downward adjacent to the apertures as shown in the different views.

Having now fully shown and described my invention and the best manner for its construction to me known at this time, I desire to have it distinctly understood that various changes and modifications may be made in the details thereof without in any manner departing from the spirit of the invention or of sacrificing any of the many advantages thereof.

What I claim and desire to secure by Letters Patent of the United States, is—

1. A hand seed corn grader, comprising a frame forming a hopper at its upper end, a screen in said frame forming the bottom of said hopper, said screen being formed to permit the free passage of a mass of corn over its apertures and having screening openings of a given width to prevent the passage of abnormally thick grains of corn, said openings being greater in length than in width, and a lower screen in said frame spaced from said upper screen to form a graded corn receptacle, said lower screen being provided with screening openings having portions that are as wide as the openings in the upper screen but shorter than the same, there being an outlet from said graded corn receptacle for the discharge of the graded corn therefrom.

2. A corn grader comprising a bodily invertible frame and a pair of spaced screens mounted in said frame one above the other, and having openings therethrough, that portion of the frame that lies above the upper screen forming a hopper-like receptacle for which the upper screen forms a bottom, the frame being open at one end of the space between the screens, the upper screen being formed to permit the free passage of a mass of corn over its apertures and having elongated openings therethrough, and the lower of said screens having openings therethrough that are as wide as but shorter than the openings of the upper screen, the lower screen being extended beyond the opening of the frame to form a spout, as and for the purpose set forth.

3. A hand seed corn grader comprising a frame forming a hopper at its upper end, a screen in said frame forming the bottom of said hopper, said screen being formed to permit the free passage of a mass of corn over its apertures and having screening openings of a given width to prevent the passage of abnormally thick grains of corn, said openings being greater in length than in width, a lower screen in said frame spaced from said upper screen to form a graded corn receptacle, said lower screen being provided with screening openings substantially as wide as the openings in the upper screen, but shorter than the same, to permit the passage of narrow and short grains there being an outlet from said graded corn receptacle for the discharge of the graded corn therefrom.

4. A seed corn grader comprising, in combination, a bodily invertible frame forming a hopper-like receptacle at its upper part, an upper screen in said frame formed to permit the free passage of a mass of corn over its apertures, said screen forming the bottom of said hopper and provided with oblong screening openings of a given width to prevent the passage of abnormally thick grains of corn, a lower screen in said frame spaced from said upper screen to form a graded corn receptacle, said lower screen being provided with screening openings substantially as wide as the openings in the upper screen but shorter than the same, to prevent the passage of grains of standard width, said upper screen being provided with means to effect the entrance of the grains of corn edgewise into its apertures, said frame being provided with a discharge opening leading from said graded corn receptacle.

5. A seed corn grader comprising, in combination, a bodily invertible frame forming a hopper-like receptacle at its upper part, an upper screen in said frame formed to permit the free passage of a mass of corn over its apertures, said screen forming the bottom of said hopper and provided with oblong screening openings of a given width to prevent the passage of abnormally thick grains of corn, a lower screen in said frame spaced from said upper screen to form a graded corn receptacle, said lower screen being provided with a number of screening openings of a given length interspersed with other openings that are greater in length but less in width than said first named openings, the screen body of said screens being formed with inclines leading downward to the openings therein, said frame being provided with a discharge opening leading from said graded corn receptacle.

In testimony whereof I have hereunto subscribed my name to this specification in the presence of two subscribing witnesses.

CHARLES HUNNICUTT.

Witnesses:
J. M. FISHER,
R. C. STUMM.